Dec. 22, 1964   P. B. RENFREW   3,162,422
TURBINE-TYPE METERING DEVICE
Filed Aug. 14, 1962   3 Sheets-Sheet 1

INVENTOR.
PAUL B. RENFREW
BY
Mellin and Hanscom
Attorneys

INVENTOR.
PAUL B. RENFREW
BY
Meelin and Hanscom
Attorneys

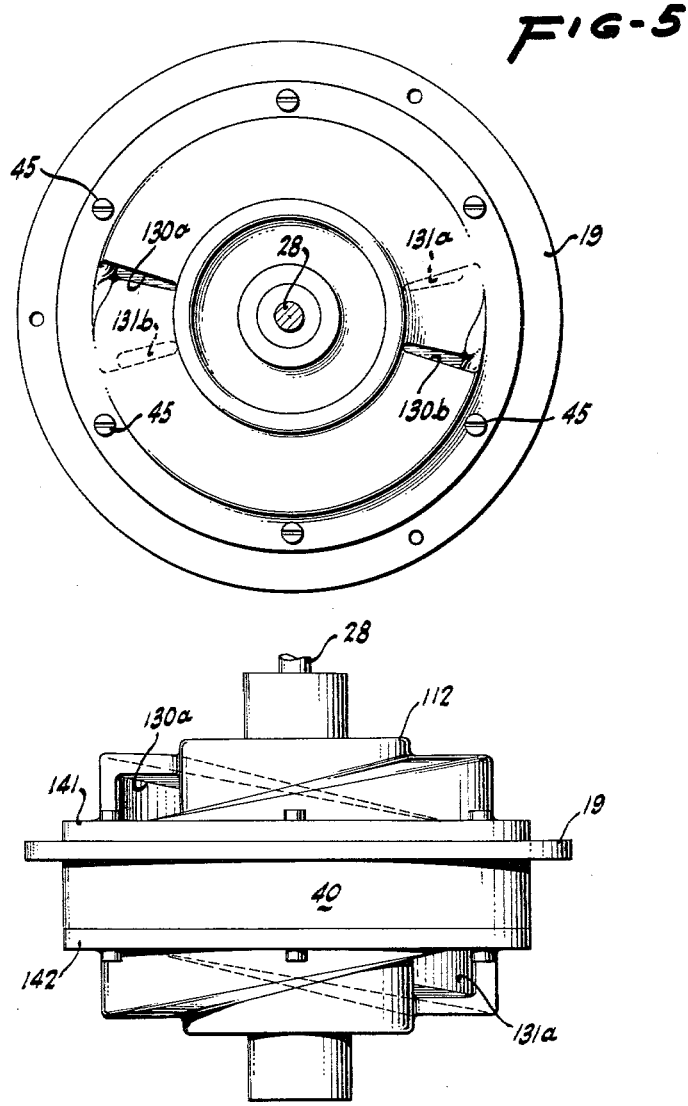

United States Patent Office 3,162,422
Patented Dec. 22, 1964

3,162,422
TURBINE-TYPE METERING DEVICE
Paul B. Renfrew, Oakland, Calif., assignor, by mesne assignments, to Rockwell Manufacturing Company, Pittsburgh, Pa., a corporation of Pennsylvania
Filed Aug. 14, 1962, Ser. No. 216,827
3 Claims. (Cl. 253—148)

This invention relates to metering devices and more particularly to turbine-type fluid motors especially useful in connection with liquid metering. It will be evident, however, that the broader principles of the invention may be used in the construction of various types of fluid motors including pumps, blowers, compressors, turbines and hydraulic drives.

Although a turbine-type fluid motor has been employed in connection with metering devices, it is believed that the present invention provides a unique construction including a fluid motor housing having a helical passageway extending between inlet and outlet openings, and comprising a rotor means disposed within the housing and having a plurality of uniformly spaced rotor blades extending radially into said passageway.

One object of this invention is to provide a turbine-type meter having many attractive features, especially as compared to conventional positive displacement meters. It is to be noted, for example, that the inventive construction has few moving parts; that there are no close-fitting moving members; that the invention will handle fluids containing abrasive foreign matter and, having fewer parts, is more easily maintained.

Another object of this invention is to provide a fluid motor or a fluid meter that will either impart or absorb the energy of a flowing fluid stream in an extremely efficient operation.

Another object of the invention is to provide a fluid motor especially suitable for metering, that permits the volume throughput per revolution of a rotor to be mathematically computed rather than arrived at by empirical formulas.

A further object is to provide a fluid meter comprising a housing having a helical passageway of substantially uniform and rectangular transverse cross section extending intermediate inlet and outlet openings, rotor means disposed within said housing including a plurality of uniformly spaced rotor blades mounted upon a rotor core and extending radially into said passageway intermediate said inlet and outlet openings, and counter means responsive to rotation of said rotor means for measuring the rate of fluid flow through said housing.

Other objects of this invention will become apparent to those skilled in the art, particularly in view of the following detailed description and the accompanying drawings.

In the drawings forming a part of this application, and in which like parts are identified by like reference numerals through the same, FIG. 1 is a vertical section of a meter housing constructed in a manner contemplated by this invention, showing a novel type of fluid motor measuring unit supported within the meter housing;

FIG. 5 is a plan view of a second embodiment of a fluid motor, showing a construction having two fluid helical passages; and FIG. 6 is an elevation view of the fluid motor shown in FIG. 5.

Figure 2:
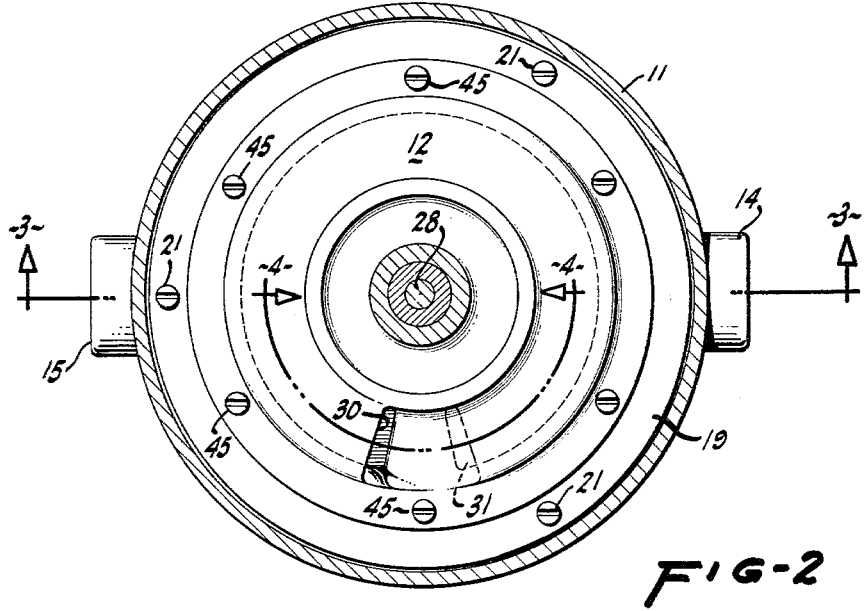
FIG. 2 is a section taken through the metering housing and on lines 2—2 of FIG. 1.

Referring to the embodiment shown in FIGS. 1–4 especially, there is shown a fluid meter 10 constructed in accordance with the teaching of this invention and comprising a meter housing 11, a fluid motor 12, and a counter device 13. Meter housing 11 is formed with an inlet opening 14 and an outlet opening 15, respectively arranged in upper and lower regions 16 and 17 which are separated by the fluid motor 12, but fluidly connected through a helical passage 18 of the fluid motor, as hereinafter described.

In a preferred construction, fluid motor 12 is provided with a flange 19 which supports the motor upon an internal flange 20 of the housing 11. A surface engagement between the flanges 19 and 20 effectively divides the interior housing into regions 16 and 17. Fluid motor 12 is secured in position within the housing by means of a plurality of screws 21.

It will be further noted that the housing 11 is provided with a removable cover plate 22 secured in place by screws 23, and counter 13 is supported upon cover plate 22, being rigidly attached by screws 24.

Counter 13, which is of conventional construction, includes a driven shaft 25 having a transverse pin 26 adapted to be engaged on diametrically opposite sides by the projecting ends of a rotatably driven clutch member 27. Clutch member 27, of course, is secured to the vertical operating rotor shaft 28 of fluid motor 12. A packing member 29 fluidly seals the housing 11 about the shaft 25, thereby preventing moisture from leaking into counter 13.

The metering arrangement shown provides ready access to the fluid motor 12. Moreover, the entire assembly of parts allows the metering apparatus to be easily maintained, observed and repaired.

Figure 3:
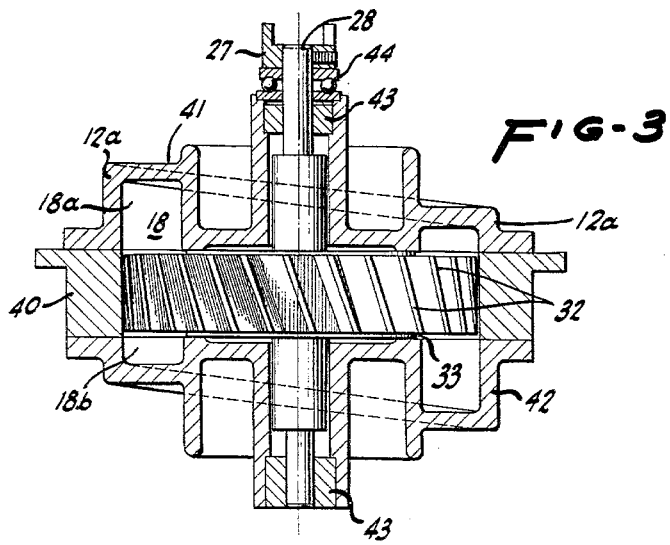
FIG. 3 is a vertical center section of the measuring unit shown in FIGS. 1 and 2 and taken on lines 3—3 of FIG. 2.
Figure 4:
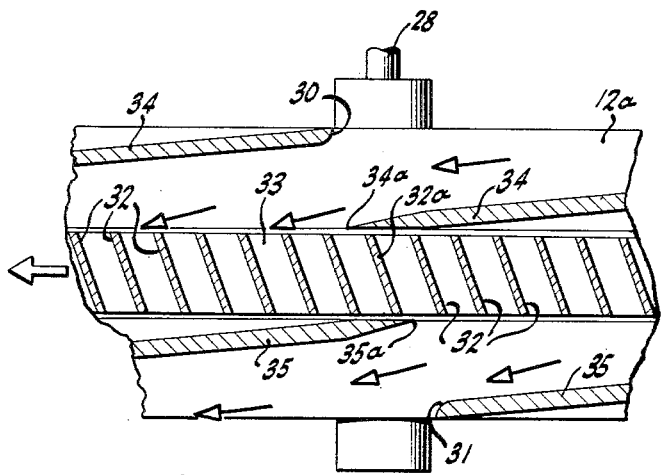
FIG. 4 is an enlarged and extended section taken on lines 4—4 of FIG. 1.

Referring to FIGS. 3 and 4, helical fluid passageway 18 extends approximately one convolution intermediate an inlet opening 30 and an outlet opening 31, said openings being respectively exposed within regions 16 and 17 of the housing 11. A turbine or rotor means including a plurality of rotor blades 32 mounted to a cylindrical hub 33 is disposed within the housing 12a of the fluid motor 12.

It will be evident that as fluid from region 16 passes through the opening 30 and downward through the helical passageway 18, the rotor means is turned clockwise as viewed in FIG. 2. Moreover, in view of FIG. 4, all fluid passing through the fluid motor 12 must necessarily pass through the blades 32 if dispensed through the opening 31.

Although the helical fluid passageway 18 extends approximately one convolution, it will be seen that the openings 30 and 31 are angularly displaced to prevent a direct axial movement between the openings rather than through the passageway. FIG. 4 most clearly shows that fluid seals are provided by the upper and lower walls 34 and 35, respectively, of housing 12a, and by the blade 32a which then occupies a position between the closest surfaces of those walls. The internal side walls of the housing 12a and the external cylindrical surface of the rotor hub 33 completes a fluid seal preventing a by-pass of the passageway 18.

Importantly, in order to secure the maximum fluid seal in the vertical direction, walls 34 and 35 which respectively define the upper and lower confines of passageway 18 should be overlapped a distance equal at least to the distance between adjacent blades 32. This of course ensures that at least one blade 32 occupies a position between the walls to effectuate a seal, as the blade 32a shown. Since the lower edge 34a of the wall 34 and the upper leader edging 35a of the wall 35 may be regarded as the limits defining the openings 30 and 31, respectively, a suitable fluid seal is effected whenever the openings 30 and 31 are angularly displaced in an amount equal to the spacing between blades 32.

In metering constructions it is important that the cross-sectional area of passageway 18 be retained uniform throughout its length. This permits a ready computation of the amount of fluid passing through the fluid motor for each revolution of the rotor means. However, where volume measurements are unimportant, or if the fluid motor were to operate as a pump or blower, the inlet passage should under some conditions be of greater cross-sectional area than the outlet passage in order for the rotor blades to properly fill. These conditions would exist whenever the rotor means would be operated at a speed greater than that at which fluid could be introduced through the inlet opening of a uniform passageway.

In FIG. 3, the areas of the openings 30 and 31 are approximately equal to the transverse cross-sectional area of the helical passageway 18 less the approximate area of each blade. In other words, the area of openings 30 or 31 is approximately equal to the sum of the areas 18a and 18b as shown. Since the flow stream of fluid through passageway 18 is directed at an angle approximately normal to the blades, there is an exceedingly high efficiency in operation of the rotor means, which is moved at approximately the same angular speed as fluid within passageway 18. The efficiency of rotor operation is greatly enhanced by the fact that all fluid conducted along passageway 18 must pass through the blades 32.

It is to be understood, of course, that the efficiency of the fluid motor would depend greatly upon the viscosity of the liquid and also upon the velocity of the flow through the passageway 18. It is believed, however, that with relatively non-viscous liquids, good efficiency may be obtained for metering purposes with a mean blade velocity as low as two feet per second and as high as ten feet per second.

This invention further contemplates a unique fluid motor construction comprising a three-part housing. Referring particularly to FIG. 3, housing 12a includes an intermediate portion 40 having a circular cavity and being disposed between a pair of symmetrical end plates 41 and 42. The end plates may be formed by casting, each having a substantially circular cavity and a uniform radial cross section open to the interior cavity of the intermediate portion 40. The circular cavity of each end plate progressively increases in depth from a leading edge, such as the edges 34a and 35a which lie in planes in close proximity to an end of the intermediate portion; and each circular cavity of end plates 41 and 42 define a circular continuation of the interior surface of intermediate portion 40.

Rotor hub 33, it will be noted, is formed with an outer surface providing a circular continuation of the radially innermost edge of each circular cavity of end plates 41 and 42. An assemblage of the three-part housing 12a together with the rotor hub 33 thereby defines the helical passageway 18. A symmetry in the plate cavities may be utilized to produce a passageway of substantially uniform cross section. Moreover, assuming that the intermediate portion and each end plate is formed with a circular cylindrical cavity and that the outer surface of the hub 33 is also of cylindrical form, as shown, helical passageway 18 will have a rectangular transverse cross section. Such an arrangement enhances the manufacture of a fluid motor for metering wherein the sum of the cross-sectional areas above and below the rotor means of passageway 18 is maintained constant and equal to the inlet and outlet openings 30 and 31.

The rotor shaft 28 may be mounted in bearings 43 which may be of any suitable type, and the rotor may be maintained in a proper vertical condition by selective attachment of clutch member 27 and a thrust ball bearing assembly 44.

Figure 1:
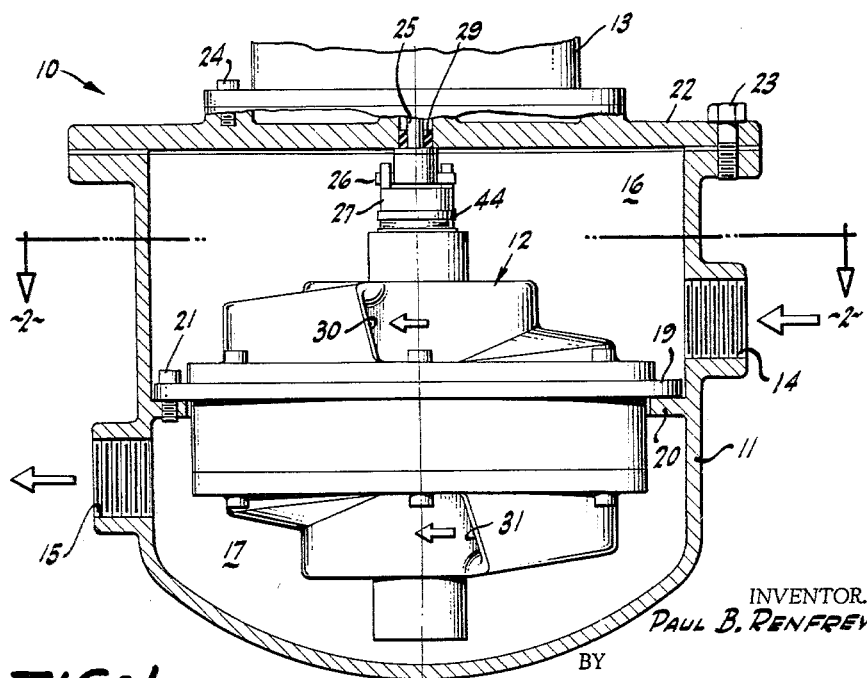

The three-part housing 12a is held together by a plurality of screws 45 as shown in FIGS. 1 and 2.

Referring to FIGS. 5 and 6, there is shown a second embodiment of the invention and illustrating a fluid motor having dual inlet and outlet ports. The use of multiple inlet and outlet ports advantageously reduces the size of the fluid motor which would otherwise be necessary to accommodate high-volume flow rates.

Fluid motor 112 possesses many of the same advantages attributable to motor 12. In fact, motor 112 may be formed by the mere substitution of a new set of end plates 141 and 142, the intermediate portion 40 and interiorly housed rotor means being identical in size and shape to the part earlier described in connection with fluid motor 12.

Each of the end plates 141 and 142 is formed with a pair of circular cavities increasing in depth from a leading edge adjacent to the cylindrical end of the intermediate portion 40 and terminating at inlet and outlet openings. As shown, end plate 141 is provided with inlet openings 130a and 130b, which respectively connect with outlet openings 131a and 131b of plate 142. The circular cavities of each end plate extend approximately one-half convolution, and it will be evident that complementary cavities of each end plate, together with the circular cavity of the intermediate portion 40, define a pair of helical flow passages.

Referring to FIG. 5, it will be evident that plates 141 and 142 are angularly oriented to ensure a proper seal between openings 130a and 131b and openings 130b and 131a. As in the embodiments shown in FIGS. 1–4, the seal area between each pair of openings should extend angularly about the axis of the passageway a distance at least as great as the spacing between adjacent blades of the rotor. Accordingly, all fluid passing through the fluid motor 112 must enter either openings 130a or 130b and after passing through the helical passageways, the fluid is expelled through outlet openings 131a and 131b.

Although FIGS. 5 and 6 disclose an embodiment using dual inlet nad outlet ports, it will be readily seen that other arrangements of inlet and outlet ports, as with pairs of three, four, and so on, might also be utilized. While with dual ports the helical passageways extend something less than 180° apart, three helical passageways would extend less than 120° and four passageways, less than 90° each.

From the preceding description and the drawings, it will be evident that the invention contemplates a fluid motor having a helical or spiral passageway. Although in some applications it might be necesary to confine the fluid flow both as it enters and leaves the rotor blades, for other applications it may be desirable to either confine fluid as it leaves the blades, or only as it enters the blades, or not at all. It is to be realized, however, that the spiral itself tends to confine the fluid flowing through the rotor blades, thereby tending to increase the efficiency when either absorbing the energy from a flowing stream or imparting energy thereto.

The efficiency of the fluid motors contemplated by this invention will be inherently high, since the direction of flow through the helical passageway is approximately at right angles to the surface of the rotor blades and also approaches a right angle with respect to the rotor shaft. Of course, the angle of the rotor blades relative to the flow stream can be varied to meet design requirements.

The fluid motors contemplated by this invention possess the further advantage that the theoretical volume throughput can be mathematically computed for each rotor revolution. This advantage is of unique importance in connection with metering applications.

It is to be understood that the forms of the invention herewith shown and described are to be taken as preferred examples thereof, and that various changes may be made in the shape, size and arrangement of certain parts without departing from the spirit of the invention or the scope of the attached claims, and each of such changes is contemplated.

Having thus described my invention, what I claim and desire to secure by Letters Patent is:

1. A fluid meter comprising: a housing having a helical pasageway of substantially uniform and rectangular cross-section extending intermediate inlet and outlet openings, said helical pasageway extending slightly less than one convolution intermediate said inlet and outlet opening, rotor means disposed within said housing including a plurality of uniformly spaced rotor blades mounted upon a rotor core and extending radially into said passageway intermediate said inlet and outlet openings, and characterized in that a portion of said housing that defines said passageway and a portion of said rotor means provide a fluid seal between said inlet and outlet openings, said seal extending angularly about the axis of said passageway a distance at least as great as the spacing between adjacent blades of said rotor means.

2. A fluid motor comprising: a housing having a helical passageway extending intermediate inlet and outlet openings, and rotor means disposed within said housing including a plurality of uniformly spaced rotor blades mounted upon a rotor core and extending radially into said passageway, a portion of said housing defining said passageway and a portion of said rotor means providing a fluid seal between inlet and outlet openings, said seal extending angularly about the axis of said passageway a distance at least as great as the spacing between adjacent bldes of said rotor means.

3. A fluid motor comprising: a housing having a first helical passageway extending intermediate first inlet and outlet openings, a second helical passageway convolutely arranged about the same axis as the first and extending between second inlet and outlet openings, each passageway extending approximately one-hailf convolution between its inlet and outlet openings, and rotor means disposed within said housing including a plurality of uniformly spaced rotor blades mounted upon a rotor core and extending radially into said first and second passageways, the inlet opening of each passageway being angularly displaced relative to the outlet opening of the other a distance at least as great as the spacing between adjacent blades of said rotor means, portions of said housing and rotor means providing a fluid seal between inlet and outlet openings and extending angularly about the axis of said passageways.

References Cited by the Examiner
UNITED STATES PATENTS

| | | | |
|---|---|---|---|
| 637,672 | 11/99 | Scholz | 73—229 |
| 1,162,848 | 12/15 | Brush | 103—89 |

RICHARD C. QUEISSER, *Primary Examiner.*

DAVID SCHONBERG, *Examiner.*